United States Patent
McElreath

(10) Patent No.: US 6,871,124 B1
(45) Date of Patent: Mar. 22, 2005

(54) METHOD AND SYSTEM FOR GUIDING AN AIRCRAFT ALONG A PREFERRED FLIGHT PATH HAVING A RANDOM ORIGIN

(75) Inventor: Kenneth W. McElreath, Cedar Rapids, IA (US)

(73) Assignee: Rockwell Collins, Cedar Rapids, IA (US)

(*) Notice: Subject to any disclaimer, the term of this patent is extended or adjusted under 35 U.S.C. 154(b) by 0 days.

(21) Appl. No.: 10/456,694

(22) Filed: Jun. 6, 2003

(51) Int. Cl.[7] .......................... G06F 19/00; G01C 23/00
(52) U.S. Cl. ......................................... 701/16; 340/947
(58) Field of Search .............................. 701/3, 4–5, 10, 701/14, 16, 26, 23, 120, 201, 209, 210, 226, 301; 340/947–949, 950–951, 960, 967, 968–979

(56) References Cited

U.S. PATENT DOCUMENTS

| | | | | |
|---|---|---|---|---|
| 4,377,848 A | * | 3/1983 | Flannigan et al. | 701/11 |
| 6,057,786 A | * | 5/2000 | Briffe et al. | 340/975 |
| 6,289,270 B1 | * | 9/2001 | Baumgarten | 701/26 |
| 6,438,469 B1 | * | 8/2002 | Dwyer et al. | 701/16 |

* cited by examiner

*Primary Examiner*—Thu V. Nguyen
(74) *Attorney, Agent, or Firm*—Nathan O. Jensen; Kyle Eppele

(57) ABSTRACT

An aircraft FMS/guidance system which provides for automated and immediate calculation of a preferred flight path and full heading, pitch-and-roll guidance along that path for paths of random origins, such as during late-occurring missed approaches and circling-to-land maneuvers.

9 Claims, 2 Drawing Sheets

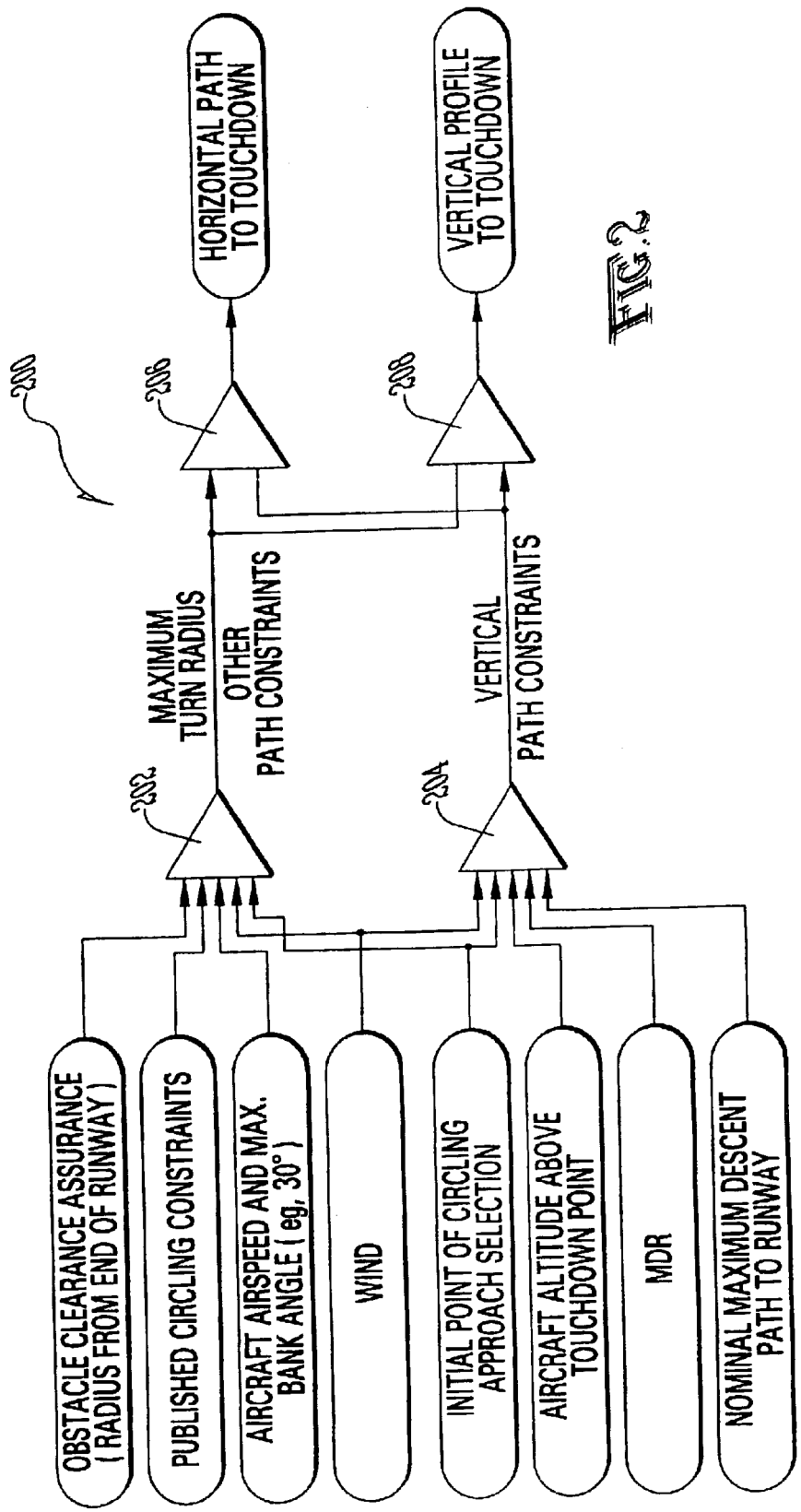

US 6,871,124 B1

METHOD AND SYSTEM FOR GUIDING AN AIRCRAFT ALONG A PREFERRED FLIGHT PATH HAVING A RANDOM ORIGIN

FIELD OF THE INVENTION

The present invention generally relates to aircraft guidance and flight management systems (FMSs), and more particularly relates to a system for calculating and guiding an aircraft along a preferred flight path from a random current location of an aircraft, and even more particularly relates to methods and systems for automatically and immediately providing heading, pitch-and-roll instructions when an aircraft is unable to follow published procedures or paths.

BACKGROUND OF THE INVENTION

In the past, pilots have often been given the sole responsibility for guiding their aircraft during events, such as missed approaches and circling maneuvers. Often the responsibility upon the pilot is considerable.

One example of a situation where a pilot is called upon to bear a considerable burden is during circling maneuvers. The Aeronautical Information Manual (AIM) from the Federal Aviation Regulations states the following:

"Circling may require maneuvers at low altitude, at low airspeed, and in marginal weather conditions. Pilots must use sound judgment, have an in-depth knowledge of their capabilities, and fully understand the aircraft performance to determine the exact circling maneuver, since weather, unique airport design, and the aircraft position, altitude and airspeed must all be considered."

The problem is compounded because the time for making all of these decisions is inherently limited owing to the fact that the aircraft is constantly moving, and the area for obstacle-free flight is limited. For example, the final approach obstacle clearance area is often 2.3 miles or less for most approach categories. This means that the pilot must react immediately and correctly on the first attempt. There often will not be a sufficient margin for making a circling error and later correcting such an error.

Attempts have been made to provide pilots with detailed guidance information and precise guidance for controlling the attitude of the aircraft. Synthetic vision systems have been proposed where a "tunnel through the sky" is displayed to a pilot. These synthetic vision systems have the capability of providing much needed assistance to the pilots.

While these synthetic vision systems may have many advantages in particular uses, they are often limited to calculating and displaying guidance along a published path from a predetermined starting point. These synthetic vision systems have heretofore been unable to provide a precise path and full heading, pitch-and-roll guidance from random locations of an aircraft, such as during missed approaches, especially late occurrences of missed approaches.

Consequently, there exists a need for improved methods and systems for aiding a pilot with full guidance information along a non-published preferred flight path with random origin.

SUMMARY OF THE INVENTION

It is an object of the present invention to provide a guidance system which reduces pilot workload and occasions for pilot error.

It is another object of the present invention to provide an enhanced situational awareness for a pilot at critical stages of flight.

It is yet another object of the present invention to provide a possibility for determining a better flight path than might otherwise be determined or even recommended under existing published procedures.

It is a feature of the present invention to utilize an adaptive FMS or other guidance system which automatically calculates a preferred flight path from any location of an aircraft.

It is a feature to provide full heading, pitch-and-roll guidance along a preferred flight of random origin.

It is another feature of the present invention to provide the pilot with the ability to select various situations, such as missed approaches and circle-to-land, etc., and in response thereto, provide automated path and full guidance information from random locations.

It is an advantage of the present invention to greatly reduce the occasion for pilot error during certain maneuvers, such as missed approaches and circling to land.

The present invention is a system and method for guiding an aircraft which is designed to satisfy the aforementioned needs, provide the previously stated objects, include the above-listed features and achieve the already articulated advantages. The present invention is carried out in a "pilot error-less" manner in a sense that the workload and judgment necessary to safely operate an aircraft in certain circumstances along a flight path of random origin has been greatly reduced, which reduces the occasions for pilot error.

Accordingly, the present invention is an aircraft guidance system including an FMS or other guidance system which automatically calculates a preferred flight path and provides full heading, pitch-and-roll guidance even where the origin of the preferred flight path is from a random location of the aircraft, away from published paths.

BRIEF DESCRIPTION OF THE DRAWINGS

The invention may be more fully understood by reading the following description of the preferred embodiments of the invention, in conjunction with the appended drawings wherein:

FIG. 2 is a more detailed diagram of a system of FIG. 1, with constraints being shown for circling and missed approaches.

DETAILED DESCRIPTION

Figure 1:
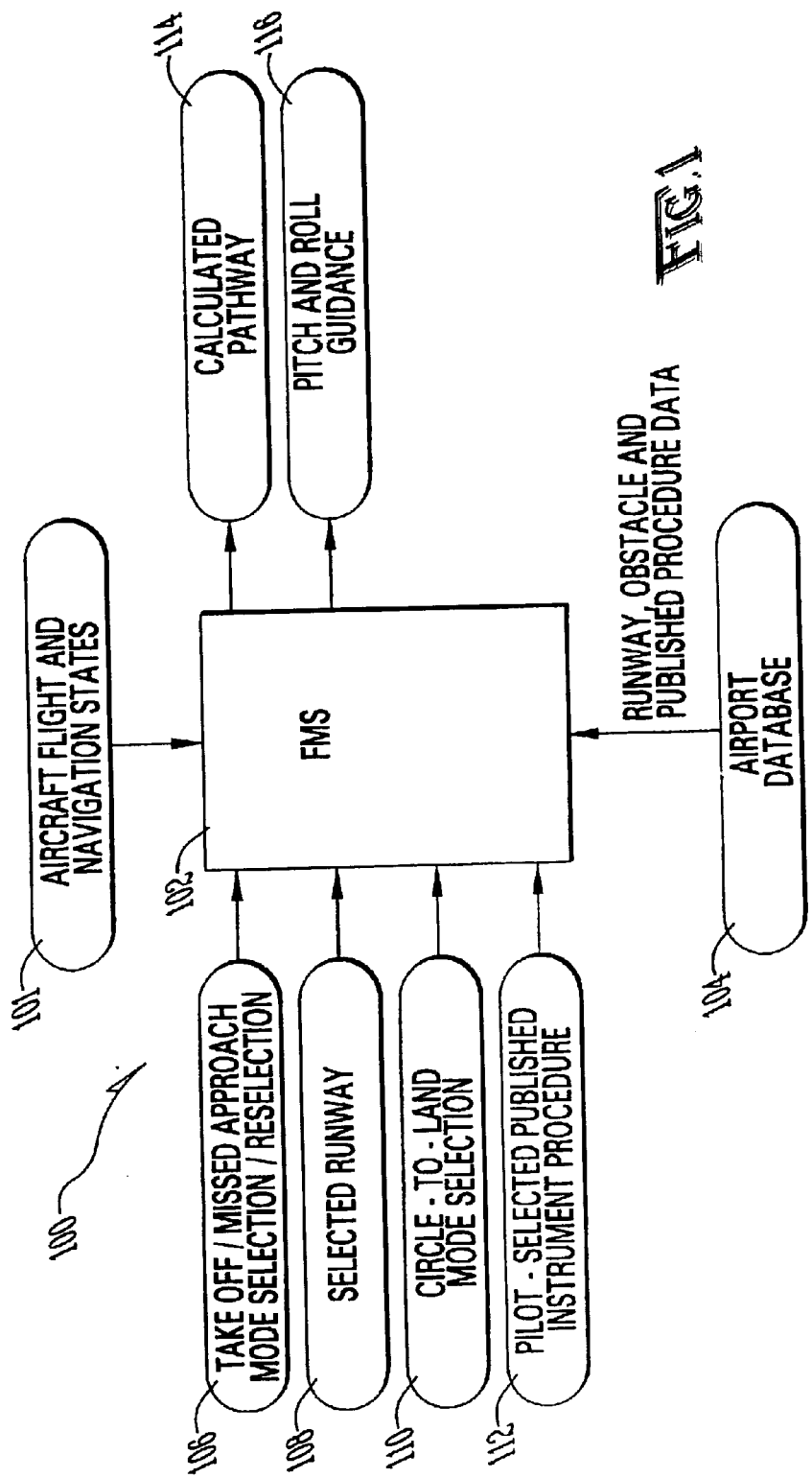
FIG. 1 is a block diagram of an FMS/Guidance system of the present invention, which includes inputs for requesting path calculation and guidance for a plurality of circumstances.

Now referring to the drawings wherein like numerals refer to like matter throughout, there is shown an aircraft guidance system of the present invention, generally designated 100, which includes an FMS 102. FMS 102 is preferably a modified FMS from the prior art. FMS 102 is preferably an FMS as is used in the Synthetic Vision Information System (SVIS), which has been under development for and testing by Rockwell Collins Inc. of Cedar Rapids, Iowa and the National Aeronautics and Space Administration (NASA) Aviation Safety Program for several years. This FMS 102 could be nearly identical to the FMS used in the prior art SVIS systems, with a few modifications. As was done with the prior art SVIS, an airport database 104 would be coupled to the FMS 102 to provide runway, obstacle and published procedure data. As is done in the prior art SVIS, aircraft flight and navigation states 101 are provided as inputs to the FMS 102. As is done in the prior art SVIS, another input into the FMS 102 would be a pilot-selected published instrument procedure 112, which is of the type which has a known point of origin. The FMS 102 would generate, as is done in prior art SVIS, a calculated pathway 114. This is the "highway in the sky" and one of the reasons for the moniker "synthetic vision." It should be understood that the present invention does not always require a calculated pathway 114. Many of the advantages of the present invention could be achieved by giving the pilot heading, pitch-and-roll guidance through a flight director. This, too, is known in the art to provide this type of guidance for pilot-selected instrument published procedure 112.

The system 100 of the present invention could be constructed nearly identically to prior art SVIS, but with the addition of key inputs, such as takeoff/missed approach mode selection/reselection 106, selected runway 108, and circle-to-land mode selection 110.

Now referring to FIG. 2, there is shown a logic diagram of a process which would preferably be implemented in a modification to prior art software to FMSs used in prior art SVISs. FIG. 2 is focused on the constraints applied for a circling approach maneuver. It is believed that similar constraints would be made for a missed approach maneuver. The details of such constraints would vary, depending upon the particular implementation. However, after reviewing this description, one skilled in the art could readily adapt the logic shown in FIG. 2 to address a missed approach scenario. FIG. 2 shows details about how both horizontal and vertical paths to touchdown are determined. A system generally designated 200 is shown having a first accumulator 202 of constraints, which has as inputs the following representative inputs: obstacle clearance assurance (radius from end of runway); published circling constraints; aircraft airspeed and maximum bank angle. The magnitude and direction of the wind is an input into both first accumulator 202 and second accumulator 204. Similarly, the position of the aircraft at the point of selection of the circling procedure, as well as current position of the aircraft, is provided to both accumulators 202 and 204. Accumulator 202 considers all of the inputs and generates, among other things, a maximum turn radius. Accumulator 204 accepts as inputs wind, position, aircraft altitude above touchdown point, maximum descent rate (MDR), nominal maximum descent path to runway. Accumulator 204 generates a vertical path constraint which is combined with the horizontal path constraint (max turn radius) by both combiners 206 and 208 to generate horizontal and vertical paths respectively.

In operation, the system and method of the present invention could function as follows:

A pilot is approaching an airport on a published instrument approach procedure, with the intent of executing a circle-to-land maneuver to a specified runway, selected using selection means 108 on FIG. 1. Upon acquiring visual contact with the airport and runway environment, the pilot selects the circle-to-land guidance mode, using selection means 110. The FMS 102 accesses information about the airport and published circle-to-land constraints from database 104, along with aircraft flight and navigation states 101. It uses this information to generate detailed pitch-and-roll guidance for the pilot to follow, in order to arrive safely and comfortably at the landing runway threshold.

While maneuvering to land, for some reason, the pilot loses visual contact with the runway at a late stage in the approach; e.g., an unexpected patch of ground fog obstructs the pilot's visibility.

The pilot then selects the missed approach selection 106 from a previously selected runway 108. The FMS 102 accesses information from the database 104 about the particular airport and gathers aircraft flight and navigation states (position, speed, attitude, etc.) and considers the constraints as described with respect to FIG. 2 above, and generates detailed guidance for the pilot to follow. The guidance can include a calculated pathway 114 and/or a pitch-and-roll guidance 116 via a flight director, etc. In a preferred embodiment of the present invention, the guidance information would be presented to the pilot in a style and manner similar or identical to ways such information is presented to a pilot using prior art SVISs for pilot-selected published instrument procedures.

In view of the high level of skill in the art known by designers of prior art SVISs, it is thought that the method and apparatus of the present invention will be understood from the foregoing description and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

I claim:

1. An aircraft guidance system comprising:
    a flight management system (FMS) which is designed to provide detailed guidance information to a pilot upon selection by the pilot of published instrument procedures;
    a mode select, coupled to said FMS, said mode select configured for selecting a circling scenario, where a circling selection of the circling scenario results in an automatic and immediate generation, by said FMS, of heading, pitch-and-roll guidance information, which is responsive to a random current position at a time when said circling selection occurs;
    a display, coupled to said FMS, for visually presenting said heading, pitch-and-roll guidance information to the pilot;
    wherein said heading, pitch-and-roll guidance information is responsive to both an input of a predetermined maximum bank angle and a location determined after said circling selection is made; and
    wherein said heading, pitch-and-roll guidance information is further responsive to a predetermined obstacle clearance assurance determined after said circling selection is made.

2. An aircraft guidance system of claim 1 wherein said heading, pitch-and-roll guidance information is generated in a multi-step approach where horizontal and vertical constraints are first considered independently and later merged.

3. An aircraft guidance system of claim 2 further comprising a takeoff selection input which tailors guidance generated by said FMS to be more suitable during takeoff maneuvers.

4. An aircraft guidance system of claim 3 wherein wind characteristics, runway selection, and published procedure data are simultaneously included in inputs provided to said FMS and used in generating guidance for takeoff maneuvers.

5. An aircraft guidance system of claim 1 wherein said heading, pitch-and-roll guidance information is integrated and provided through a display of a three-dimensional tunnel.

6. An aircraft guidance system of claim 1 wherein said heading, pitch-and-roll guidance information is provided through separate displays of heading, pitch-and-roll guidance.

7. An aircraft guidance system of claim 1 wherein said heading, pitch-and-roll guidance information is simultaneously responsive to an input of an aircraft altitude above touchdown point, runway selection, published procedure data, wind, and aircraft performance.

8. An aircraft guidance system of claim 1 wherein said circling scenario is a missed approach and wherein said circling selection is a missed approach selection.

9. An aircraft guidance system of claim 1 wherein said circling scenario is a circle-to-land scenario and wherein said circling selection is a circle-to-land selection.

* * * * *